United States Patent
Vadada et al.

(10) Patent No.: US 10,527,640 B2
(45) Date of Patent: Jan. 7, 2020

(54) SYSTEM AND METHOD FOR PITOT TUBE BLOCKAGE DETECTION

(71) Applicant: Rosemount Aerospace Inc., Burnsville, MN (US)

(72) Inventors: Divakara Rao Vadada, Karnataka (IN); Divya Rajan Pillai, Karnataka (IN)

(73) Assignee: ROSEMOUNT AEROSPACE INC., Burnsville, MN (US)

(*) Notice: Subject to any disclaimer, the term of this patent is extended or adjusted under 35 U.S.C. 154(b) by 30 days.

(21) Appl. No.: 15/896,643

(22) Filed: Feb. 14, 2018

(65) Prior Publication Data

US 2019/0178906 A1    Jun. 13, 2019

(30) Foreign Application Priority Data

Dec. 13, 2017    (IN) .............................. 201711044821

(51) Int. Cl.
| | | |
|---|---|---|
| *G01F 1/46* | (2006.01) |
| *G01P 5/16* | (2006.01) |
| *G01P 5/165* | (2006.01) |
| *G01P 21/02* | (2006.01) |
| *B64D 43/02* | (2006.01) |

(52) U.S. Cl.
CPC ................ *G01P 5/165* (2013.01); *G01F 1/46* (2013.01); *G01P 21/025* (2013.01); *B64D 43/02* (2013.01)

(58) Field of Classification Search
CPC .................................. G01F 5/165; G01F 1/46
See application file for complete search history.

(56) References Cited

U.S. PATENT DOCUMENTS

| | | | |
|---|---|---|---|
| 6,205,376 B1 * | 3/2001 | Gordon ..................... G01P 5/16 701/4 |
| 8,060,334 B1 | 11/2011 | Jarvinen | |
| 9,097,735 B2 | 8/2015 | Martin et al. | |
| 9,116,162 B2 | 8/2015 | Leblond et al. | |
| 9,557,204 B2 * | 1/2017 | Edmond .................... G01F 1/88 |
| 9,804,011 B2 * | 10/2017 | Mesnard .............. G01F 25/0007 |
| 10,197,588 B2 * | 2/2019 | Wong .................... G01K 13/028 |

* cited by examiner

*Primary Examiner* — Jewel V Dowtin
(74) *Attorney, Agent, or Firm* — Cantor Colburn LLP

(57) ABSTRACT

A method of detecting blockage of a pitot tube includes measuring a pitot tube temperature via one or more temperature sensors located inside a pitot tube, measuring an outside ambient air temperature, comparing the measured pitot tube temperature to a minimum pitot tube temperature threshold for the measured outside ambient air temperature, and determining the pitot tube has a blockage condition when the measured pitot tube temperature is below the minimum pitot tube temperature threshold.

16 Claims, 4 Drawing Sheets

SYSTEM AND METHOD FOR PITOT TUBE BLOCKAGE DETECTION

FOREIGN PRIORITY

This application claims priority to India Patent Application No. 201711044821, filed Dec. 13, 2017, and all the benefits accruing therefrom under 35 U.S.C. § 119, the contents of which in its entirety are herein incorporated by reference.

BACKGROUND

Exemplary embodiments pertain to the art of pitot-static systems, and more particularly detection of blockage of pitot tubes of pitot-static systems.

A pitot-static system as used in an aircraft is a system of pressure-sensitive instruments that is most often used in aviation to determine an aircraft's airspeed, Mach number, altitude, and altitude trend. A pitot-static system generally includes of a pitot tube, a static port, and the pitot-static instruments. Other instruments that might be connected are air data computers, flight data recorders, altitude encoders, cabin pressurization controllers, and various airspeed switches. Errors in pitot-static system readings can be extremely dangerous as the information obtained from the pitot static system, such as altitude, is potentially safety-critical.

One source of error in the pitot-static system is related to blockage or obstruction inside the pitot tube. Reasons for blockage may include icing, volcanic ash, dirt, foreign object (like insects), duct tapes, pitot covers etc. The blockage or obstruction of the pitot tube results in erroneous data regarding airspeed, altitude or the like being indicated on the instruments. This results in confusion in crew, spatial disorientation and potentially catastrophic failures.

BRIEF DESCRIPTION

In one embodiment, a method of detecting blockage of a pitot tube includes measuring a pitot tube temperature via one or more temperature sensors located inside a pitot tube, measuring an outside ambient air temperature, comparing the measured pitot tube temperature to a minimum pitot tube temperature threshold for the measured outside ambient air temperature, and determining the pitot tube has a blockage condition when the measured pitot tube temperature is below the minimum pitot tube temperature threshold.

Additionally or alternatively, in this or other embodiments the method includes determining whether a pitot tube heater is operational, and selecting the minimum pitot tube temperature threshold based on the measured outside ambient air temperature and an operational status of the pitot tube heater.

Additionally or alternatively, in this or other embodiments the method includes alerting a flight crew regarding the blockage condition.

Additionally or alternatively, in this or other embodiments the alert is a visual and/or aural alert.

Additionally or alternatively, in this or other embodiments the minimum pitot tube temperature threshold is obtained from a temperature calibration database.

Additionally or alternatively, in this or other embodiments measuring a pitot tube temperature includes measuring three of more pitot tube temperatures via three or more temperature sensors located at three or more longitudinal locations of the pitot tube.

Additionally or alternatively, in this or other embodiments the three or more temperature sensors are located at three or more circumferential locations of the pitot tube.

In another embodiment, a pitot tube system includes a pitot tube and a blockage detection system operably connected to the pitot tube. The blockage detection system includes a plurality of pitot tube temperature sensors located inside the pitot tube configured to measure a pitot tube temperature, and a system controller operably connected to the plurality of pitot tube temperature sensors. The system controller is configured to compare the measured pitot tube temperature to a minimum pitot tube temperature threshold for a measured outside ambient air temperature, and determine the pitot tube has a blockage condition when the measured pitot tube temperature is below the minimum pitot tube Additionally or alternatively, in this or other embodiments a pitot tube heater selectably heats the pitot tube and the system controller is configured to determine whether a pitot tube heater is operational. The minimum pitot tube temperature threshold is selected based on the measured outside ambient air temperature and an operational status of the pitot tube heater.

Additionally or alternatively, in this or other embodiments an alert system provides an alert to a flight crew in the event the blockage condition is detected.

Additionally or alternatively, in this or other embodiments the alert is one or more of a visual alert or an aural alert.

Additionally or alternatively, in this or other embodiments the plurality of temperature sensors are three or more temperature sensors located at different longitudinal locations along the pitot tube.

Additionally or alternatively, in this or other embodiments the plurality of temperature sensors are located at different circumferential locations around the pitot tube.

Additionally or alternatively, in this or other embodiments one or more outside ambient air temperature sensors obtain the outside ambient air temperature.

Additionally or alternatively, in this or other embodiments the pitot tube includes one or more total pressure openings and one or more static pressure openings.

Additionally or alternatively, in this or other embodiments the system operation is initiated by a user input at any point during operation of the pitot tube.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
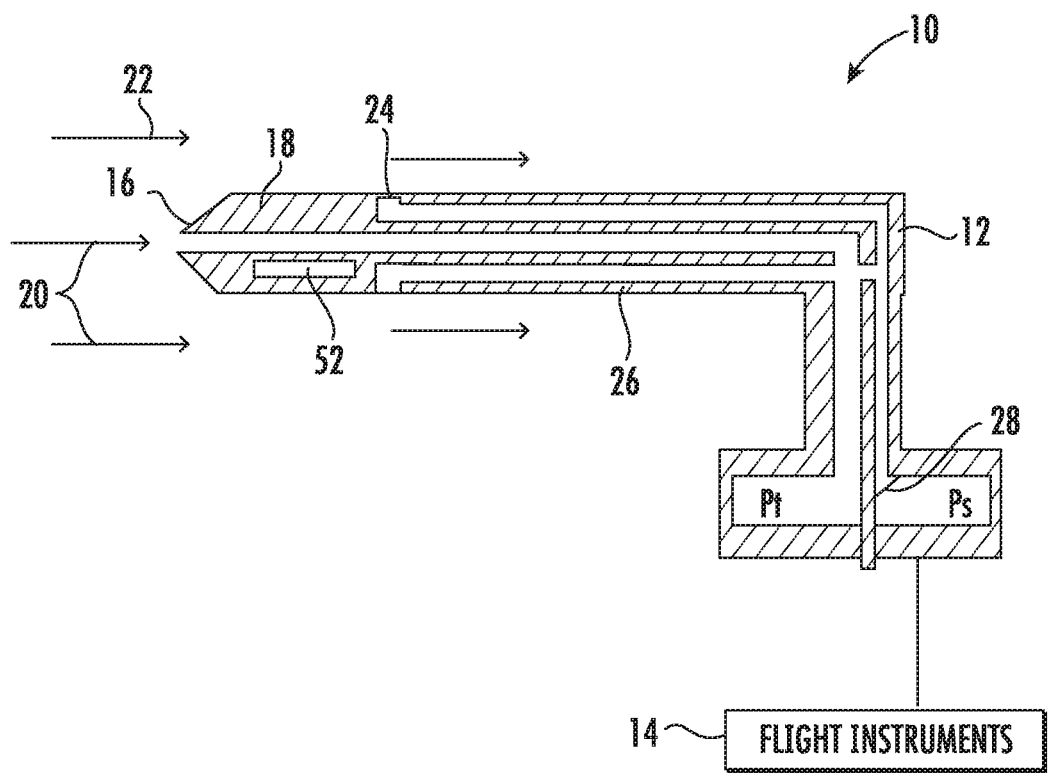
FIG. 1 is a schematic illustration of an embodiment of a pitot-static system.

Shown in FIG. 1 is a schematic illustration of an embodiment of a pitot-static system 10. The pitot-static system 10 includes a pitot tube 12, which is connected to one or more flight instruments 14, such as an altimeter, airspeed indicator, and/or a vertical speed indicator. The one or more flight instruments 14 utilize data collected via the pitot tube 12 to provide indications at the one or more flight instruments 14 of, for example, altitude, airspeed, and/or vertical speed, of an aircraft at which the pitot-static system 10 is installed.

In some embodiments, such as shown in FIG. 1, the pitot tube 12 includes a total pressure opening 16, which is located at a distal end 18 of the pitot tube 12 such that airflow 20 enters the total pressure opening 16 in the direction of travel 22. The pitot tube 12 further includes one or more static pressure openings 24 oriented substantially perpendicular to the direction of travel 22. In some embodiments, the static pressure openings 24 are located at an outer perimetrical surface 26 of the pitot tube 12. Airflow 20 entering the total pressure opening 16 and the static pressure openings 24 proceed to a pressure transducer 28, at which a difference between measured static pressure and measured total pressure is determined, and is indicative of, for example, airspeed, altitude and/or vertical speed of the aircraft. Further, the pitot tube 12 includes a pitot tube heater 52 to heat the pitot tube 12 when the pitot tube heater 52 is operated.

Figure 2:
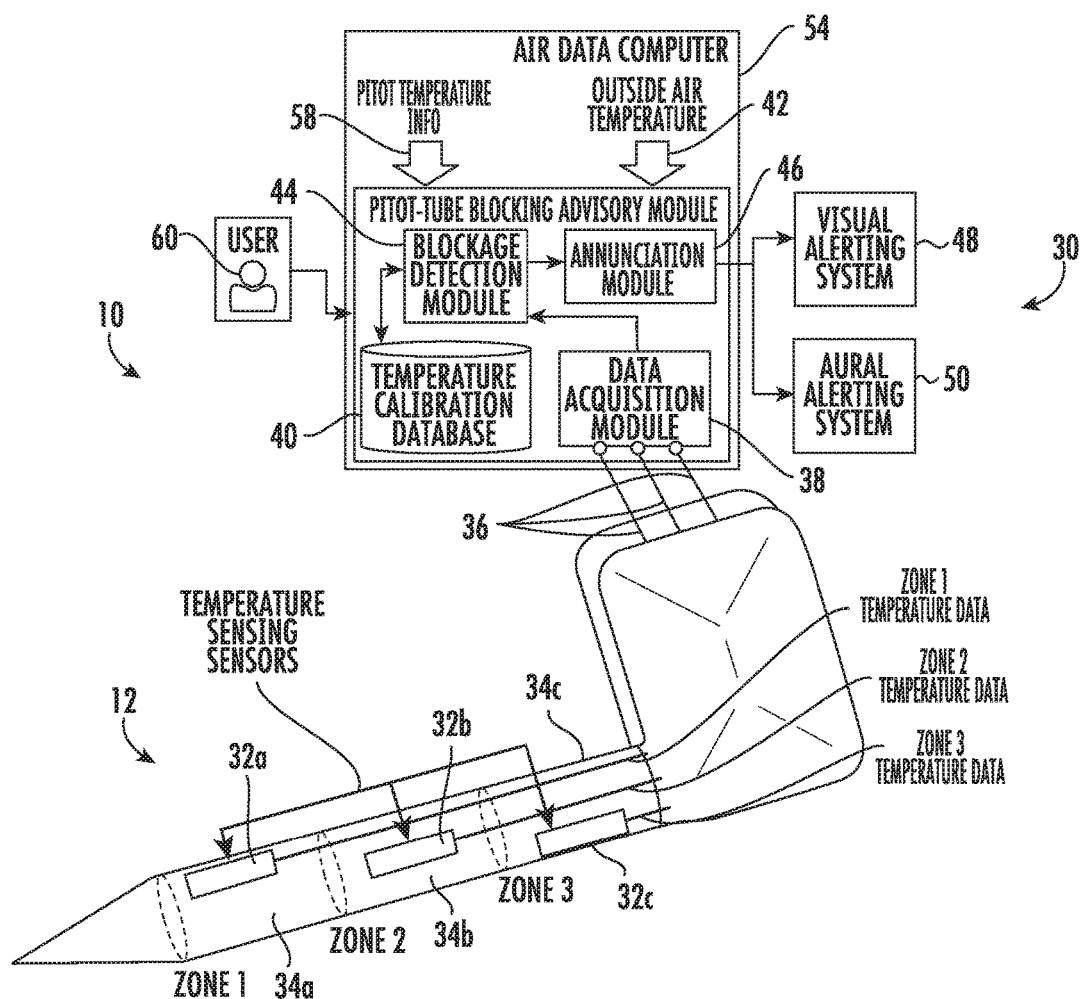
FIG. 2 is a schematic illustration of an embodiment of a pitot tube blockage advisory module.

Referring now to FIG. 2, the pitot-static system 10 further includes a blockage detection system 30 connected to the pitot tube 12 for the detection and indication of blockage of the pitot tube 12 by, for example, ice accumulation. The blockage detection system 30 provides feedback to a flight crew of the aircraft such that indications by the one or more flight instruments 14 may be erroneous.

Figure 3:
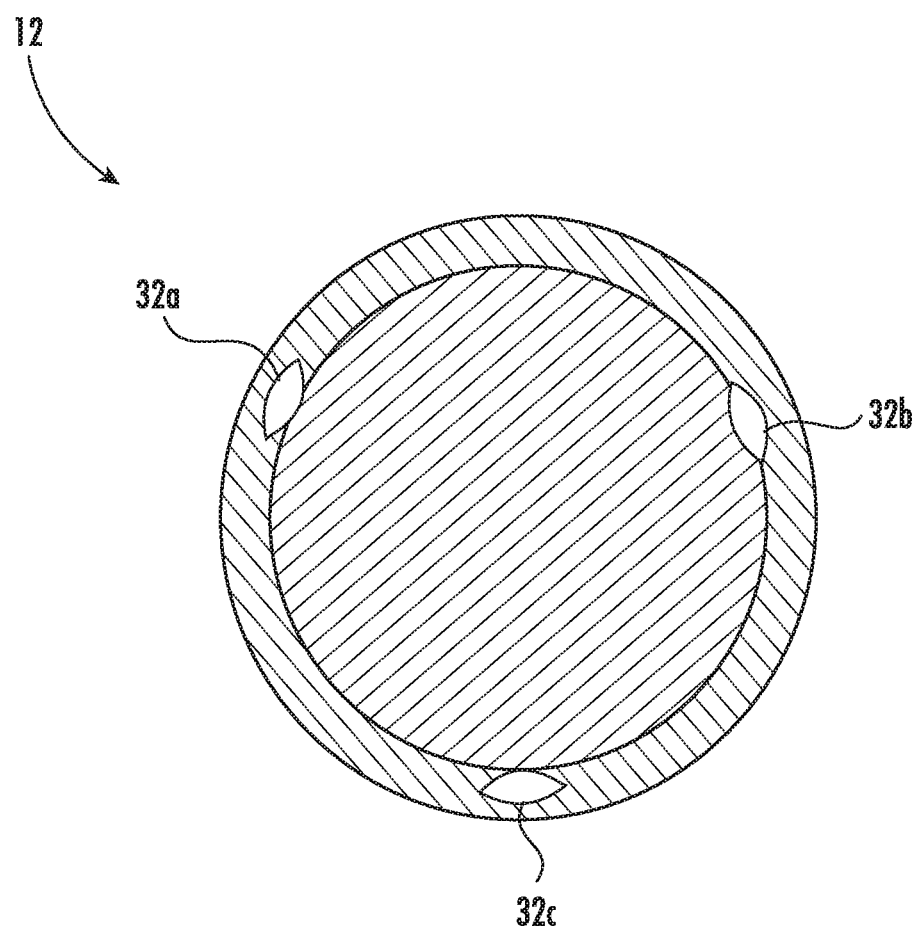
FIG. 3 is a cross-sectional view of an embodiment of a pitot tube.

The blockage detection system 30 includes a plurality of tube temperature sensors 32 disposed along the length of the pitot tube 12, which are configured to measure an internal temperature of the pitot tube 12. The tube temperature sensors 32 may be located in defined longitudinal zones of the pitot tube 12, defining different portions of the length of the pitot tube 12. For example, in the embodiment of FIG. 2, first tube temperature sensor 32a is located in first pitot tube zone 34a, tube second temperature sensor 32b is located in second pitot tube zone 34b, and third tube temperature sensor 32c is located at third pitot tube zone 34c, so that tube temperatures at different portions of the tube length may be measured by the tube temperature sensors 32 and the blockage detection system 30. Further, referring to FIG. 3, the tube temperature sensors 32a, 32b and 32c may be located at different circumferential locations of the pitot tube 12. While three tube temperature sensors 32a, 32b, 32c are utilized in the illustrated embodiment, one skilled in the art will readily appreciate that other quantities of tube temperature sensors 32 may be utilized.

Referring again to FIG. 2, the tube temperature sensors 32 are connected to a system controller 54 via one or more sensor lines 36. In some embodiments, each tube temperature sensor 32 is connected to the system controller via a separate sensor line 36, while in other embodiments a shared sensor line 36 may be utilized by the tube temperature sensors 32 to transmit data to the system controller 54. A data acquisition module 38 collects the data transmitted by the tube temperature sensors 32 to the system controller 54. The system controller 54 further includes a temperature calibration database 40. The temperature calibration database 40 includes a minimum temperature threshold for a given outside ambient air temperature for each of the tube temperature sensors 32. Further, the minimum temperature threshold is determined for the condition where the pitot tube heater 52 is operating and for the condition where the pitot tube heater 52 is not operating. The pitot tube heater 52 condition, whether the pitot tube heater 52 is operating or is not operating, is utilized at the system controller 54 as pitot tube temperature info 58. The temperature calibration database 40 may be established through, for example, computer modelling and/or testing in a wind tunnel or under other conditions. An outside air temperature sensor 42 is configured to sense an outside ambient air temperature. A blockage detection module 44 utilizes the collected tube temperatures, the pitot tube temperature info 58, the outside ambient air temperature, and the temperature calibration database 40 to determine if there is a blockage condition in the pitot tube 12. An annunciation module 46 signals one or more of a visual alerting system 48 or an aural alerting system 50 to produce a visual alert, such as a light or visual message and/or an aural message such as a tonal signal or a spoken alert message to the flight crew in the case of a blockage condition being detected in the pitot tube 12.

Figure 4:
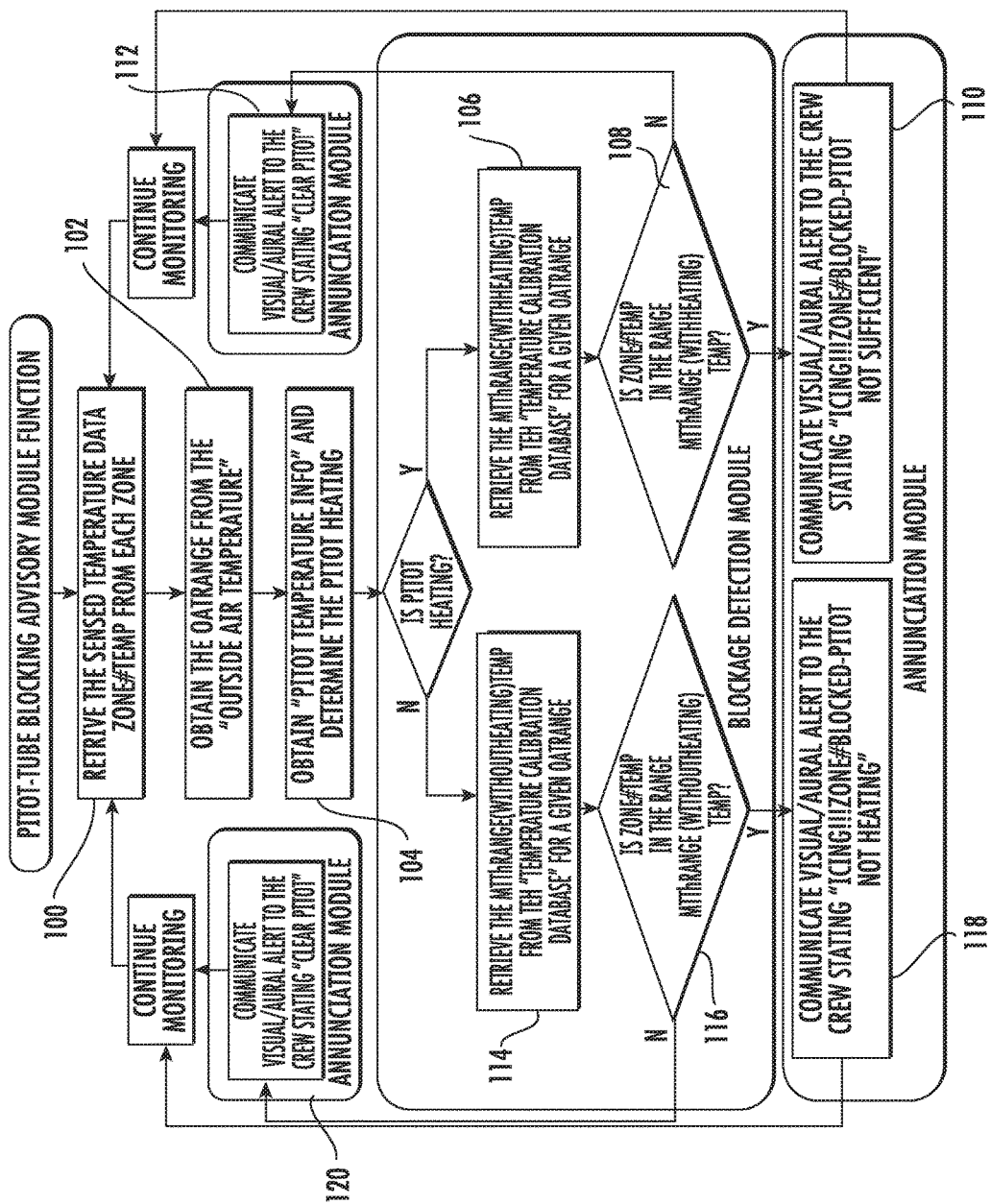
FIG. 4 is a schematic illustration of a method of determining pitot tube blockage and annunciating a pitot tube condition.

Referring now to FIG. 4, a method of operation of the blockage detection system 30 will now be described. It is to be appreciated that in some embodiments the blockage detection system 30 is continuously or periodically operated automatically by the system controller 54. Additionally, the operation of the blockage detection system 30 may be initiated by a signal from a user 60 (shown in FIG. 2) during any phase of operation of the pitot-static system 10, such as during any phase of flight operation. Referring to block 100, the sensed pitot tube temperature data is retrieved from each tube temperature sensor 32, and the outside ambient air temperature is retrieved from the outside air temperature sensor 42 to the blockage detection module 44 at block 102. At block 104, the blockage detection module 44 obtains an operating state of the pitot tube heater 52. At block 106, if the pitot tube heater 52 is operating, a corresponding minimum temperature threshold ($MTThRange_{(WithHeating)Temp}$) corresponding to the sensed outside ambient air temperature ($OAT_{Range}$) is obtained from the temperature calibration database. At block 108, the sensed pitot tube temperatures are compared to the minimum temperature threshold. If the sensed pitot tube temperatures are below the minimum temperature threshold, the annunciation mode 46 is activated at block 110 to alert the flight crew of pitot tube 12 blockage, indicating that the pitot tube heating provided by the pitot tube heater 52 is insufficient. Alternatively, if the sensed pitot tube temperatures are above the minimum temperature threshold, the blockage detection system 30 determines that no pitot tube blockage is present, and continues operation. In some embodiments, the annunciation module 46 may provide a signal indicating that the pitot tube 12 is clear of blockage at block 112.

Similarly, if the pitot tube heater 52 is not operating, a corresponding minimum temperature threshold ($MTThRange_{(WithoutHeating)Temp}$) corresponding to the sensed outside ambient air temperature is obtained from the temperature calibration database at block 114. At block 116, the sensed pitot tube temperatures are compared to the minimum temperature threshold. If the sensed pitot tube temperatures are below the minimum temperature threshold, the annunciation mode 46 is activated at block 118 to alert the flight crew of pitot tube 12 blockage, indicating that the pitot tube heater 52 is not operating. Alternatively, if the sensed pitot tube temperatures are above the minimum temperature threshold, the blockage detection system 30 determines that no pitot tube blockage is present, and continues operation. In some embodiments, the annunciation module 46 may provide a signal indicating that the pitot tube 12 is clear of blockage at block 120.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of detecting blockage of a pitot tube, comprising:
   measuring a pitot tube temperature via one or more temperature sensors disposed inside a pitot tube;
   measuring an outside ambient air temperature;
   selecting a minimum measured pitot tube temperature threshold based on the measured outside ambient air temperature;
   comparing the measured pitot tube temperature to the minimum measured pitot tube temperature threshold for the measured outside ambient air temperature; and
   determining the pitot tube has a blockage condition when the measured pitot tube temperature is below the minimum measured pitot tube temperature threshold.

2. The method of claim 1, further comprising:
   determining whether a pitot tube heater is operational; and
   selecting the minimum measured pitot tube temperature threshold based on the measured outside ambient air temperature and an operational status of the pitot tube heater.

3. The method of claim 1, further comprising alerting a flight crew regarding the blockage condition.

4. The method of claim 3, wherein the alert is a visual and/or aural alert.

5. The method of claim 1, wherein the minimum measured pitot tube temperature threshold is obtained from a temperature calibration database.

6. The method of claim 1, wherein measuring a pitot tube temperature comprises measuring three of more pitot tube temperatures via three or more temperature sensors located at three or more longitudinal locations of the pitot tube.

7. The method of claim 6, wherein the three or more temperature sensors are located at three or more circumferential locations of the pitot tube.

8. A pitot tube system, comprising:
   a pitot tube; and
   a blockage detection system operably connected to the pitot tube, including:
      a plurality of pitot tube temperature sensors located inside the pitot tube configured to measure a pitot tube temperature; and
      a system controller operably connected to the plurality of pitot tube temperature sensors, the system controller configured to:
         select a minimum measured pitot tube temperature threshold based on the measured outside ambient air temperature
         compare the measured pitot tube temperature to the selected minimum measured pitot tube temperature threshold for the measured outside ambient air temperature; and
         determine the pitot tube has a blockage condition when the measured pitot tube temperature is below the minimum measured pitot tube temperature threshold.

9. The pitot tube system of claim 8, further comprising a pitot tube heater to selectably heat the pitot tube;
   wherein the system controller is configured to determine whether a pitot tube heater is operational; and
   wherein the minimum measured pitot tube temperature threshold is selected based on the measured outside ambient air temperature and an operational status of the pitot tube heater.

10. The system of claim 8, further comprising an alert system to provide an alert to a flight crew in the event the blockage condition is detected.

11. The system of claim 10, wherein the alert is one or more of a visual alert or an aural alert.

12. The system of claim 8, wherein the plurality of temperature sensors are three or more temperature sensors located at different longitudinal locations along the pitot tube.

13. The system of claim 8, wherein the plurality of temperature sensors are located at different circumferential locations around the pitot tube.

14. The pitot tube system of claim 8, further comprising one or more outside ambient air temperature sensors to obtain the outside ambient air temperature.

15. The pitot tube system of claim 8, wherein the pitot tube includes one or more total pressure openings and one or more static pressure openings.

16. The pitot tube system of claim 8, wherein the system operation is initiated by a user input at any point during operation of the pitot tube.

* * * * *